United States Patent [19]

Patterson

[11] Patent Number: 4,611,825
[45] Date of Patent: Sep. 16, 1986

[54] ADJUSTABLE ANCHORAGE

[75] Inventor: Michael Patterson, Carlisle, England

[73] Assignee: ASE (UK) Limited, Carlisle, England

[21] Appl. No.: 758,979

[22] Filed: Jul. 25, 1985

Related U.S. Application Data

[62] Division of Ser. No. 482,293, Apr. 5, 1983, Pat. No. 4,550,933.

[30] Foreign Application Priority Data

Apr. 8, 1982 [GB] United Kingdom ................. 8210494
May 24, 1982 [GB] United Kingdom ................. 8215103

[51] Int. Cl.⁴ ............................................. B60R 22/00
[52] U.S. Cl. .................... 280/808; 297/473; 297/483; 297/486
[58] Field of Search .................... 280/801, 808; 182/3, 182/4, 8; 244/122 R, 122 B; 24/17 A, 17 AP, 464, 598, 658; 410/82, 83, 101, 104, 105; 297/468, 473, 483, 485, 486

[56] References Cited

U.S. PATENT DOCUMENTS 3,964,798  6/1976  Burleigh ............................. 280/808
4,293,255 10/1981  Hrasche ............................. 410/104

Primary Examiner—John J. Love
Assistant Examiner—Kenneth R. Rice
Attorney, Agent, or Firm—Young & Thompson

[57] ABSTRACT

An adjustable anchorage, for example a shoulder anchorage of a vehicle seat belt system, has a first part formed with a slot and a second part received in and movable along the slot. One part may support a seat belt and the other part may be part of, or be attachable to, a motor vehicle. The slot has alternate narrow and wide portions and the second part is shaped to engage in the wide slot portions. Adjustment is achieved either by rotation of the second part to align flats on it with the narrow slot portions, or by movement perpendicular to the slot against a spring bias to bring a narrow portion of the second part into the plane of the slot. Advantageously, the second member has a frusto-conical portion and the walls of the slot are shaped always to urge the second member into a wide portion when released at a position intermediate two wide portions.

19 Claims, 10 Drawing Figures

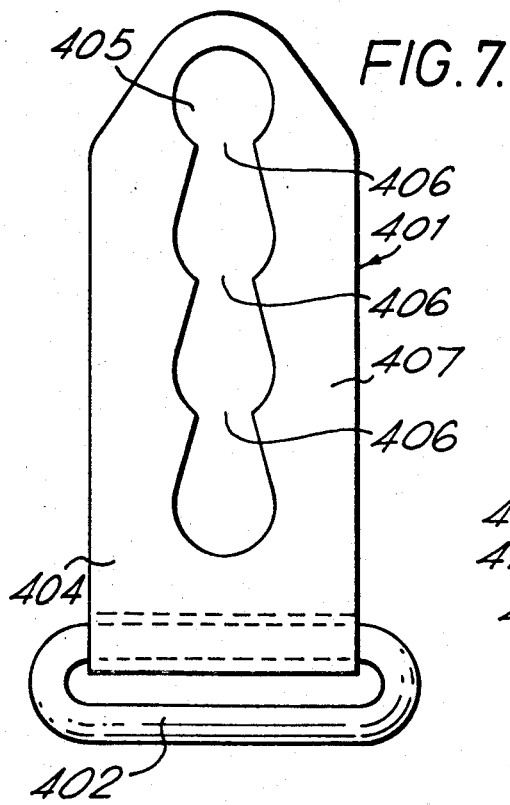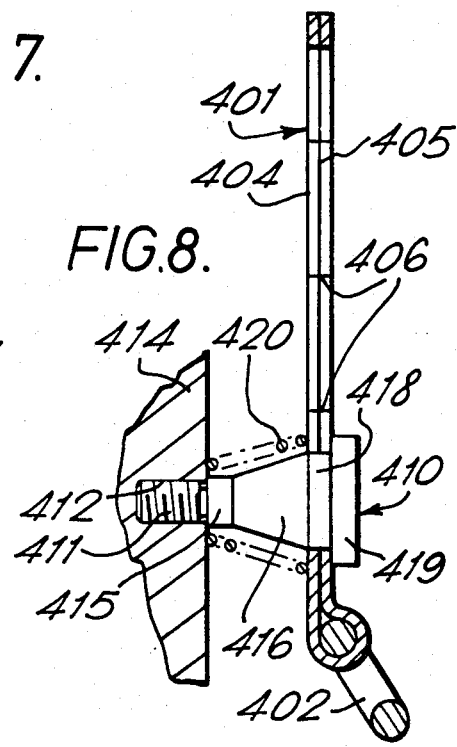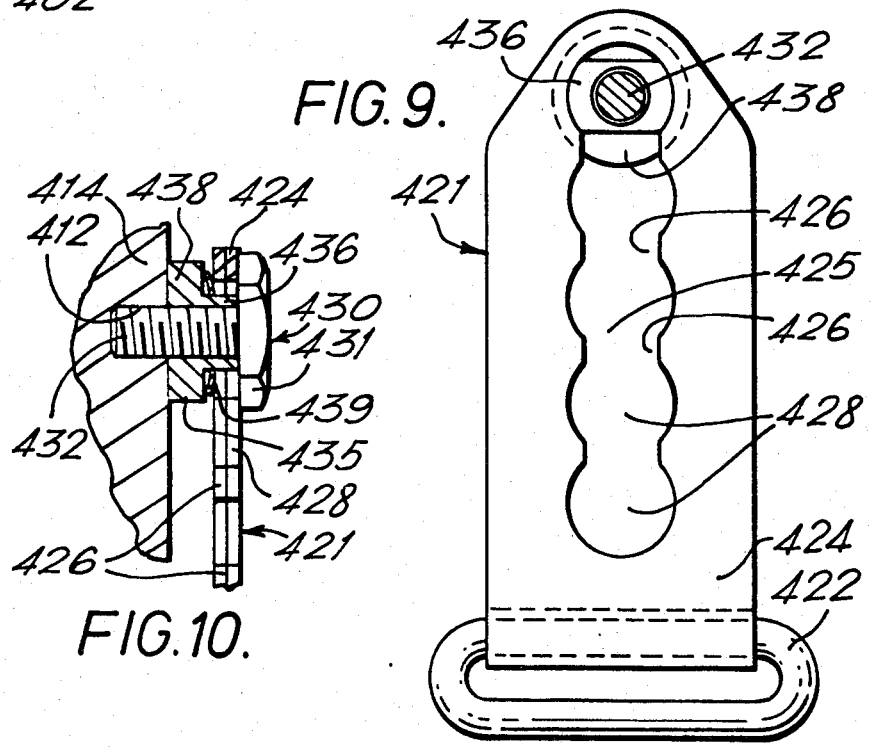

ADJUSTABLE ANCHORAGE

This application is a division of application Ser. No. 482,293, filed 4/5/83, now U.S. Pat. No. 4,550,933.

BACKGROUND OF THE INVENTION

The invention relates to adjustable anchorages. Anchorages of the invention are suitable for use in vehicles, especially road vehicles.

The invention relates particularly but not exclusively to adjustable anchorages for the upper end of the shoulder belt of a vehicle seat belt system. The shoulder belt extends in use diagonally downwards from the anchorage across the torso of the user and may have one end secured to the vehicle by way of the anchorage. Alternatively, the belt may extend to the anchorage from a retractor, the anchorage providing a loop or slot through which the belt is guided.

Anchorages according to the invention can also be used, for example, for the adjustment of a tunnel-mounted vehicle seat belt buckle which otherwise would remain stationary during adjustment of an associated seat. Further, adjustable anchorages according to the invention can also be used in a seat adjusting mechanism.

It is an object of the present invention to provide an adjustable anchorage, particularly a shoulder anchorage for a vehicle seat belt, which is simple for the user to operate.

It is a further object of the invention to provide such an adjustable anchorage which is readily manufactured and is reliable in operation.

SUMMARY OF THE INVENTION

The invention provides an adjustable anchorage comprising an element having a slot with at least one narrow portion joining spaced wider portions and a member received in the slot and having a base portion which is wider than the wider slot portions, an intermediate portion receivable in a wider slot portion but not receivable in a narrow slot portion, and an outer portion receivable in a narrow slot portion, the member being normally spring-biassed so that the intermediate portion is received in a wider slot portion, but being movable against the spring bias to a position in which the outer portion is received in the slot whereby the member is movable along the slot.

Preferably the member has frusto-conical portion extending from the outer portion to the intermediate portion and the walls of the slot are advantageously shaped to co-operate with the frusto-conical portion in such a way that the member, when released at a position intermediate adjacent wider slot portions, is urged by the spring bias into a position in which the intermediate portion engages in a wider slot portion.

Preferably, the member is movable against the spring bias on a guide post cooperating with a recess opening through the base portion of the member, the guide post having a base portion slidable on a support surface spaced from the slot and the spring bias being provided by a compression spring seated in the recess, the surface in which the slot is formed and the support surface being respectively front and rear walls of a channel-shaped member.

When the anchorage is used as a vehicle seat belt shoulder anchorage, one of the element having the slot and the member received in the slot has means (for example a belt support loop or a belt-attachment bracket) for supporting a seat belt and the other has means for attachment to a vehicle or is constituted by part of the vehicle's structure.

Further, the invention provides an adjustable anchorage comprising an element having a slot and a member received in the slot, the slot having at least one narrow portion joining wider portions and the member being so shaped that in a first angular position thereof the member and the element are relatively movable in the direction of the slot and in a second angular position the member and the element are restrained against such movement by engagement of the member in a wider portion of the slot.

Conveniently, opposite walls of the wider slot portions are respective portions of a cylindrical surface and the member has corresponding opposed part-cylindrical portions joined by opposite flat portions spaced by no more than the width of the narrow slot portions.

Again, when the adjustable anchorage is used as a shoulder anchorage of a vehicle seat belt system, one of the elements having the slot and the member received in the slot has means to support a vehicle seat belt and the other has means for its attachment to a motor vehicle body or is constituted by a part of the vehicle body.

BRIEF DESCRIPTION OF THE DRAWINGS

Embodiments of the invention will now be described by way of example with reference to the drawings, in which:

FIG. 7 is a front view of a movable member of an adjustable shoulder anchorage which is a third embodiment of the invention;

FIG. 8 is a sectional side view of the shoulder anchorage of FIG. 7;

FIG. 9 is a front view of an adjustable shoulder anchorage which is a fourth embodiment of the invention; and FIG. 10 is a partial sectional side view of the anchorage of FIG. 9.

DESCRIPTION OF THE PREFERRED EMBODIMENTS

Figure 1:
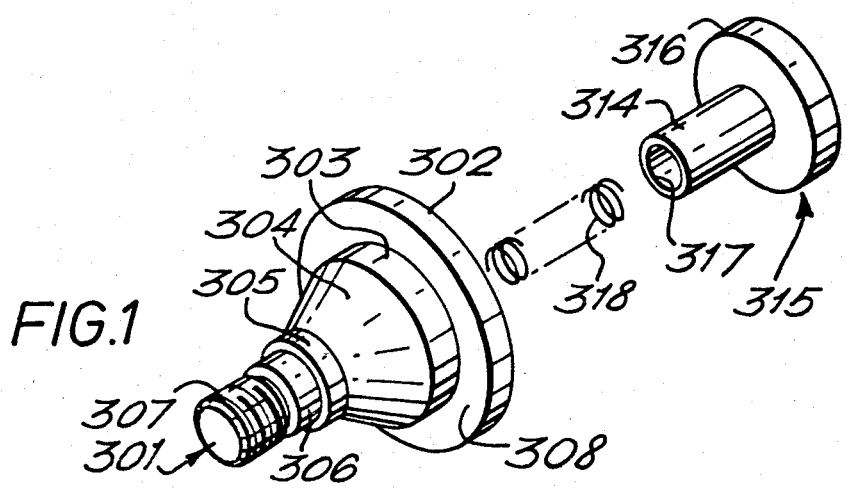
FIG. 1 is an exploded view of a part of an anchorage which is a first embodiment of the invention.

In the following description, anchorages according to the invention are described in relation to a shoulder anchorage for a vehicle seat belt.

The embodiment shown in FIGS. 1 to 5 will be described first.

The main component of the anchorage is a specially shaped latching plunger indicated generally at 301. This latching plunger 301 comprises a relatively large diameter cylindrical portion 302; a smaller diameter cylindrical portion 303; a frusto-conical portion 304; a yet smaller diameter cylindrical portion 305; a cylindrical stub portion 306 of yet smaller diameter; and an externally screw-threaded boss 307. The largest diameter cylindrical portion 302 thus defines a flat annular face 308.

The cylindrial portion 306 of the plunger 301 carries a normal webbing guide loop 309 (FIG. 2) which is attached to an elongate metal loop 310 which is connected to the seat belt (not shown) itself. A spring 311 is seated between the guide loop 309 and the step between the plunger portions 305 and 306, in order thereby to bias the guide loop 309 forwards against a locknut 312 which is screwed on to the threaded boss 307. The biassing force exerted by the spring 311 prevents excessive end float of the guide loop 309.

The rear face of the latching plunger 301 is provided with a cylindrical recess 313 which is arranged to receive, in sliding telescopic manner, a cylindrical rod 314 of a locating member which is indicated generally at 315 and which has a substantially cylindrical head 316 integral with the rod 314. The rod 314 is provided with a cylindrical recess 317, and a spring 318 is fitted within the recesses 313 and 317, seated against the respective ends of the recesses, and biassing the latching plunger 301 and locating member 315 apart.

Figure 3:
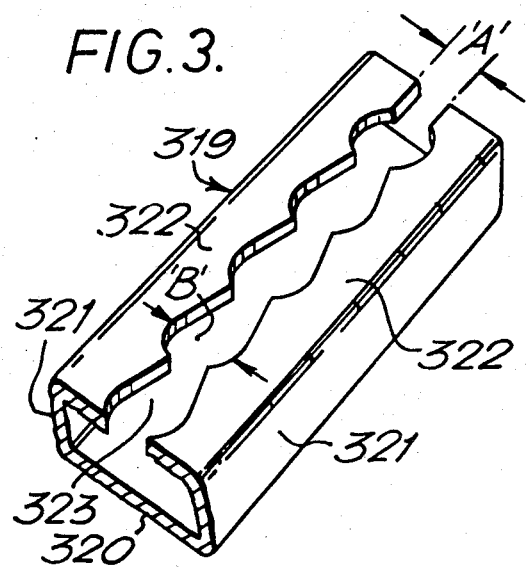
FIG. 3 is a partial perspective view of a track of the anchorage of FIG. 1 is used.
Figure 5:
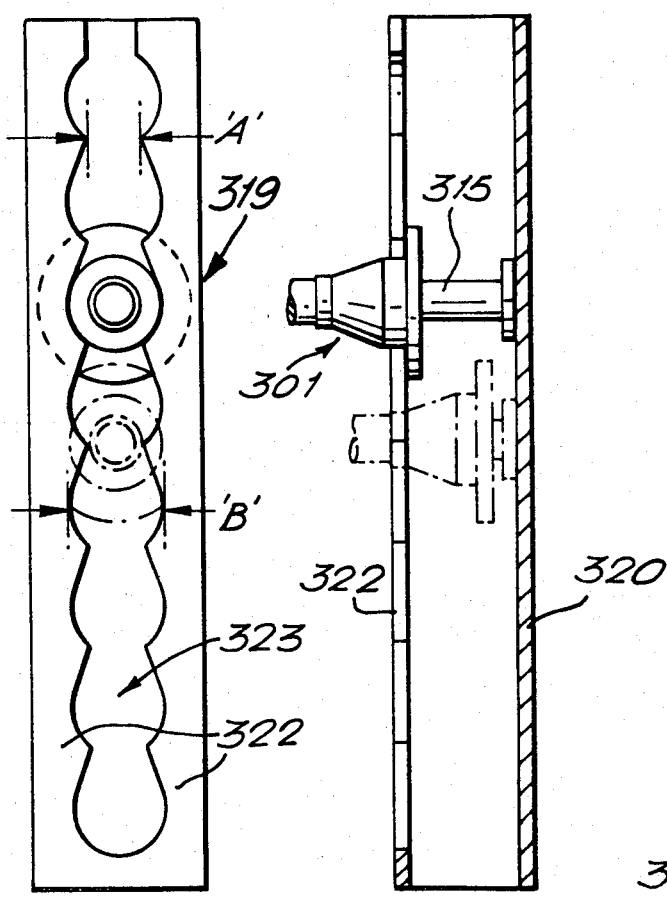
FIG. 5 further illustrates the method of use of the anchorage shown in FIGS. 1 to 4.

The belt support assembly functions in co-operation with a track 319, which may be open-ended, or closed at one end as shown in FIG. 5, comprising a rear web 320, side webs 321, and front webs 322 which extend parallel to the rear web and which define spaced edges, as shown most clearly in FIGS. 3 and 5. These spaced edges have a generally scallopped shape so that the gap 323 between the edges is of varying width along the length of the elongate metal track. This gap 323 has a minimum width, as indicated by the dimension A in FIGS. 3 and 5, and a maximum width, indicated by the dimension B in FIGS. 3 and 5. The maximum gap width B corresponds to the diameter of cylindrical portion 303 of the latching plunger 301. The minimum gap width A corresponds to the diameter of cylindrical portion 305 of the latching plunger 301.

Figure 2:
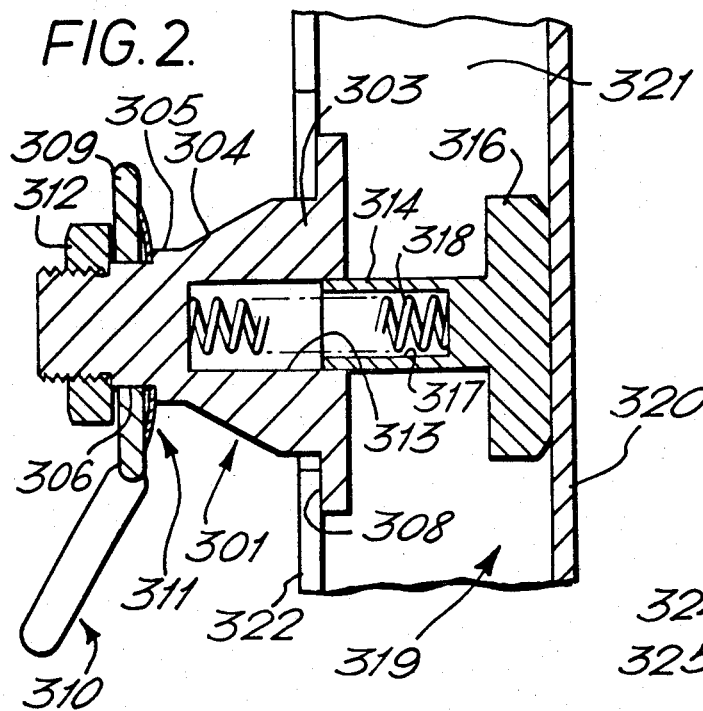
FIG. 2 is a side view, partly in section, illustrating the use of the anchorage of FIG. 1 as a shoulder anchorage for a vehicle seat belt.

The locating member 315 is made of a suitable low-friction material so that the outer face of the head 316 can slide on the inside face of the rear web 320 of the track 319. The latching plunger 301 is made of a suitably strong material to be able to withstand normal seatbelt loadings. During normal belt wearing the various components of the adjustable anchorage are positioned as shown in FIG. 2 and in the upper portion of FIG. 5. In this position the latching plunger 301 is engaged, its annular face 318 bears against the inside face of the inturned front webs 322 of the track, and the plunger projects to its maximum extent from the elongate slot or gap 323 in the track.

In order to be able to adjust the position of the belt support assembly relative to the track, either upwards or downwards, it is simply necessary to depress the locating plunger 301 against the force of the compression spring 318. This causes the cylindrical portion 305 of the plunger to become aligned with the gap 323 in the track, as shown most clearly in FIG. 5, whereupon the locating plunger can be moved up or down the track with a sliding movement. When the correct position has been reached the plunger 301 is released and is immediately biassed outwardly by the compression spring 318 so that it resumes a latched position in relation to the track. The system is "self-levelling" due to the action of the compression spring 318 which provides an outward bias for the plunger, and due to the tapering surface of the frusto-conical portion 314 of the plunger which makes it impossible for the plunger to adopt any latched position other than that shown in the upper part of FIG. 5 where it occupies a portion of the gap 323 which is of maximum transverse dimension.

Figure 4:
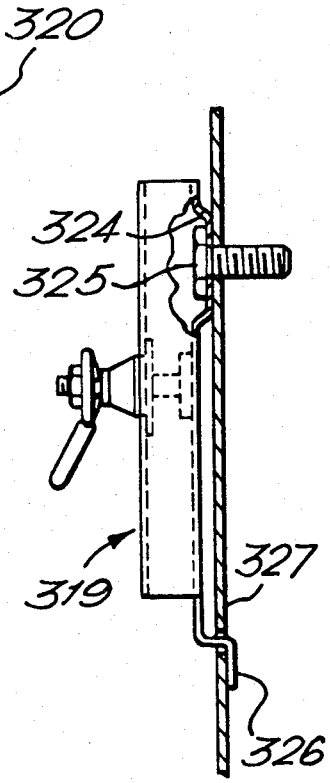
FIG. 4 is a side view illustrating one method of attaching the anchorage of FIG. 1 to a support.

FIG. 4 shows one method whereby the anchorage can be mounted on a car body, for example on a door pillar. As shown in FIG. 4 the upper portion of the track 319 is provided with a rearwardly extending bracket portion 324 through which a fastening bolt 325 is fitted. The bottom end of the track 319 is provided with a downwardly and rearwardly extending tang 326 which fits into a suitable hole or slot in the door pillar 327.

Figure 6:
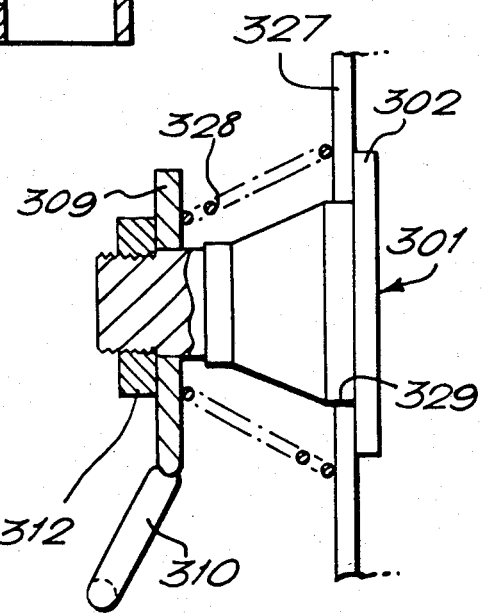
FIG. 6 is a side view of an anchorage which is a second embodiment of the invention.

FIG. 6 shows a second embodiment which is a modified version of the adjustable anchorage of FIGS. 1 to 5. This embodiment is particularly suited to an original equipment fitment. In this modified version a helical spring 328 is positioned between the normal running loop 309 and the face of the car body or door pillar 327. The outer face of the B pillar 327 can be shaped with a plurality of keyhole-type slots merging into a continuous slot 329 into which the largest diameter portion 302 of the latching plunger 301 can be fitted. In this modified version one avoids the need to use the compression spring 318, the biassing spring 311, the locating member 315 and the track 319 of the embodiment shown in FIGS. 1 to 5. The method of adjustment of this anchorage is however the same as that described above in relation to the first embodiment.

FIGS. 7 and 8 show a third embodiment of the present invention. The adjustable shoulder belt anchorage of FIGS. 7 and 8 comprises a movable member 401 having a belt support in the form of an elongate metal guide or running loop 402 carried at the lower end of a generally flat plate member 304. The plate member 404 is formed from an elongate metal strip folded on itself centrally about one long side of the running loop 402, the loop being held to the plate member so that its plane projects diagonally downwardly and outwardly from the plate member. Above the running loop 402, the plate member 404 is generally rectangular except for a rounded upper end; it is provided along its vertical axis with a symmetrical elongate aperture 405. From a semicircular lower end, the sides of the aperture 405 taper uniformly inwards to a restriction 406 in a pear-shaped pattern which is repeated above the restriction 406, in that the aperture broadens out over circular arcs to the diameter of the lower end and then again narrows to the next restriction 406, the pattern being again repeated up to the upper end of the aperture, at which the arcuate sides are continued to join together.

Co-operating with the movable member 401 is a fixed member 410 having an externally screw-threaded end portion 411 received in a tapped hole 412 provided in a vehicle frame, for example, in a pillar 414 between the front and rear doors of a private motor car. Such a hole is conventionally provided to receive a fixed belt support means. Adjoining the end portion 411, the fixed member 410 has an inner cylindrical portion 415 of slightly greater diameter providing a step which abuts against the pillar around the tapped hole 412. From the cylindrical portion 415, the member 410 flares outwardly over a frustoconical portion 416 which ends with an outer cylindrical portion 418 of about the thickness of the plate member 404. At the free end of the outer, larger diameter, cylindrical portion 418, the fixed member 410 has a head 419 which may be shaped, for example hexagonally, so as to facilitate mounting of the fixed member into the hole 412. The fixed member 410 is received through the aperture 404 of the movable member and, however shaped, the head 419 has a transverse dimension greater than the greatest width of the aperture, so that the movable member 401 is trapped between the head and the pillar 414. The diameter of the larger cylindrical portion 418 corresponds to the greatest width of the aperture 405 and the diameter of the smaller cylindrical portion 415 corresponds to the width of the restrictions 406.

Spring means in the form of a frustoconical coiled compression spring 420 acts between the pillar 413 and the adjacent face of the plate member 404 to cause this to abut the fixed element head 419, the outer cylindrical portion 418 being received in the lowermost, as shown, or in another of the four wider portions of the aperture 405.

When it is desired to adjust the anchorage to vary the height of the running loop 402, the movable member 401 is pushed towards the pillar 414 against the force of the spring 420 until the inner cylindrical portion 415 of the plate member is received in the aperture 405. In this condition, the movable plate member 401 can be raised or lowered freely; release of the pressure urging the movable member towards the pillar 414 will permit the spring 420 to return the movable member outwardly, away from the pillar, with the cylindrical portion 418 received in the nearest wide portion of the aperture. The frustoconical fixed member portion 416 guides the movable member to such a position if it is not exactly registered with the intended aperture portion.

In the adjustable shoulder anchorage of FIGS. 9 and 10, a movable member 421 comprises a running loop 422 and a plate member 424 of substantially the same shape, size and structure as the equivalent elements of FIGS. 7 and 8, the plate member 424 being however provided with an elongate aperture 425 which again extends along the vertical axis of the member but which is of different shape. As appears from FIG. 9, the aperture 425 comprises a series of parallel-sided restrictions 426 joining wider aperture portions 428 formed by circular arcs. The aperture 425 thus corresponds to a series of circular holes joined by a slot of lesser width than the hole diameter.

A fixed member 430 of the shoulder anchorage of FIGS. 9 and 10 comprises a bolt with a head 431 and a screw-threaded shank 432 received in the tapped hole 412 in the vehicle door pillar 414. Trapped between the pillar 414 and the bolt head 431 is a spacer 435 having adjacent the bolt head a portion 436 with arcuate ends lying on a circle of the same diameter as the portions 428 of the aperture 425, the arcuate ends being joined by horizontal plane portions spaced apart by a distance corresponding to the width of the restrictions 426. The bolt head 431 is omitted from FIG. 9 so that the shape of the spacer portion 436 can be seen. Between the portion 436 and the pillar 414, the spacer 435 has a cylindrical portion 438 of greater diameter than that of the aperture portions 428.

The movable member 421 is received on the fixed member 431 with the portion 436 received in the aperture 425 so the plate member 424 is trapped between the spacer cylindrical portion 438 and the bolt head 431. Spring means in the form of a dished spring washer 439 acts between the spacer portion 438 and the plate member 424.

It will be clear from FIG. 9 that the movable member 421 will remain securely mounted on the fixed member 430 as long as the axis of the former does not approach the horizontal. Adjustment of the level of the loop 422 can however be effected by rotating the movable member 421 about the spacer 435 through 90° in either direction. The movable member can then be moved horizontally, because the planar sides of the spacer portion 436 can be received between the restrictions 426 in the aperture 425. When the desired adjustment has been made, the movable member 421 can be allowed to fall back to a generally vertical position as shown in FIG. 9, which the spacer portion 436 received in a selected one of the portions 425 of the aperture 425. It will be noted that the spring washer 439 does not have to be substantially stressed in order to allow adjustment to be made but serves to keep the relatively movable parts of the anchorage in abutment to prevent rattle and oppose undesired rotation of the movable member 421.

It is evident that those skilled in the art will make numerous modifications of the specific embodiments described above without departing from the present inventive concepts, for example, in the first embodiment the track 319 can be formed with a guide loop and the plunger 301 can be arranged to be secured to a vehicle body. The second embodiment can be modified similarly, as can the third and fourth embodiments by formation of the apertures 405 and 425 in members not movable in use relative to the vehicle body and provision of guide loops on the members 410 and 430. Likewise, the shape of the slot of the first and third embodiments and can be modified to that of the second embodiment and vice-versa. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. Adjustable anchorage means comprising a first member having a slot and a second member received in said slot, said slot having at least one narrow portion joining wider portions and said second member being rotatable relative to the first member about an axis transverse to the direction of extent of said slot and being so shaped that in a first angular position thereof relative to said first member, said first and second members are relatively movable in said direction of extent of the slot and in a second angular position thereof relative to said first member, said second member is restrained against such movement by engagement of said second member in a wider portion of said slot.

2. The anchorage means of claim 1, wherein said second member has opposed part-cylindrical portions centered on said transverse axis and joined by opposed flat portions spaced by no more than the width of said narrow slot portions and opposed walls of said wider slot portions are respective portions of corresponding cylindrical surfaces.

3. The anchorage means of claim 1, wherein one of said first and second members has support means for a seat belt and the other has means for mounting the anchorage on a motor vehicle body.

4. The anchorage means of claim 3, wherein said first member has support means for a seat belt.

5. The anchorage means of claim 4, wherein said first member has a first elongate portion and a second elongate portion extending from one end of said first portion, around a seat belt loop constituting said support means for a seat belt, to lie in face-to-face contact with said first portion, said slot being formed by aligned slots in said first and second portions.

6. Adjustable shoulder anchorage means for a vehicle seat belt system, said anchorage means comprising:
a first member having support means for a seat belt and means defining a slot in said first member, and
a second, mounting member having a portion receivable in said slot and means for securement to a vehicle body,
said slot-defining means comprising slot wall means defining at least two wider slot portions and at least one intermediate narrower portion, and
said portion of said second member receivable in said slot being engageable with said first member in a first position relative to said first member and at a said wider slot portion and being movable from said first position to a second position relative to said first member in order to free said second member from engagement with said first member for movement along said slot to a different said wider slot portion.

7. The adjustable anchorage means of claim 6, wherein said portion of said second member receivable in said slot includes a first portion which is of sufficient width to engage with said slot wall means at said wider slot portions in said first relative position and a second portion of lesser width which can pass through said narrower slot portion from said second relative position, said first and second relative positions being attained by relative movement of said first and second members transversely to the plane in which said slot extends.

8. The adjustable anchorage means of claim 7, wherein said first and second portions are circular cylindrical portions disposed coaxially with respect to an axis in the direction of which said relative movement of said first and second members takes place.

9. The adjustable anchorage means of claim 8, wherein said first and second circular cylindrical portions are joined by a frusto-conical portion.

10. The adjustable anchorage means of claim 7, including resilient biassing means biassing said first and second members towards said first relative position thereof.

11. The adjustable anchorage means of claim 10, wherein said resilient biassing means comprises a coil spring extending around said second member and having first and second ends which respectively abut said first member and are positioned for abutment with said vehicle body.

12. The adjustable anchorage means of claim 10, wherein said slot wall means are shaped to cooperate with said receivable portion of said second member in such a way that said second member is urged by said resilient biassing means to a wider slot portion when released from its second position between adjacent wider slot portions.

13. The adjustable anchorage means of claim 6, wherein said first member has a first elongate plate portion and a second elongate plate portion extending from one end of said first elongate portion, around a portion of a seat belt running loop constituting said support means, to lie in face-to-face contact with said first elongate portion, said slot being formed by aligned slots in said first and second elongate portions.

14. The adjustable anchorage means of claim 6, wherein said portion of said second member receivable in said slot includes a portion which has a dimension in a first direction which is large enough to engage with said slot wall means at said wider slot portions in said first relative position and a dimension in a second direction, different from said first direction, which is small enough to allow said second member to pass through said narrower slot portions from said relative position, said first and second relative positions being attained by rotation of said second member about an axis transverse to the plane in which said slot extends.

15. The adjustble anchorage means of claim 14, wherein said second member comprises a threaded shank constituting said means for securement to a vehicle body and a shoulder extending around said shank and having said dimensions in said first and second directions transverse to the axis of said shank.

16. The adjustable anchorage of claim 15, wherein said shank is the shank of a bolt which has a head which abuts said first member in said first and said second relative positions of said first and second members, said shoulder being formed on a collar member having a bore through which said shank passes.

17. The adjustable anchorage means of claim 6, wherein said wider slot portions are formed by opposed part circular cylindrical portions of said slot wall means and said portion of said second member receivable in said slot has opposed part circular cylindrical portions joined by opposed flat portions spaced by no more than the width of said narrow slot portion, said first and second relative positions of said first and second members being attainable by rotation of said second member about the axis of the cylinder defining its said circular cylindrical portions.

18. The adjustable anchorage means of claim 17, wherein said first member has a first elongate plate portion and a second elongate plate portion extending from one end of said first elongate portion, around a portion of a seat belt running loop constituting said support means, to lie in face-fo-face contact with said first elongate portion, said slot being formed by aligned slots in said first and second elongate portions.

19. Adjustable anchorage means for a vehicle seat belt system, said anchorage means comprising:
a first member having support means for a seat belt and means defining a slot in said first member, and
a second member receivable in said slot and having means for securement to a vehicle body,
said slot-defining means defining a plurality of spaced positions along said slot at which said first member is securable against movement along said slot.

* * * * *